United States Patent
Sayama et al.

(10) Patent No.: US 12,135,068 B2
(45) Date of Patent: Nov. 5, 2024

(54) HOLLOW SPRING AND METHOD OF MANUFACTURING THE SAME

(71) Applicant: MITSUBISHI STEEL MFG. CO., LTD., Tokyo (JP)

(72) Inventors: Hironobu Sayama, Ichihara (JP); Toru Hirokane, Ichihara (JP)

(73) Assignee: MITSUBISHI STEEL MFG. CO., LTD., Tokyo (JP)

( * ) Notice: Subject to any disclaimer, the term of this patent is extended or adjusted under 35 U.S.C. 154(b) by 353 days.

(21) Appl. No.: 17/618,160

(22) PCT Filed: May 15, 2020

(86) PCT No.: PCT/JP2020/019498
§ 371 (c)(1),
(2) Date: Dec. 10, 2021

(87) PCT Pub. No.: WO2021/229808
PCT Pub. Date: Nov. 18, 2021

(65) Prior Publication Data
US 2022/0170524 A1   Jun. 2, 2022

(51) Int. Cl.
| | |
|---|---|
| *F16F 1/14* | (2006.01) |
| *B60G 21/055* | (2006.01) |
| *C21D 9/02* | (2006.01) |
| *F16F 1/02* | (2006.01) |
| *C21D 9/08* | (2006.01) |

(52) U.S. Cl.
CPC ............. *F16F 1/14* (2013.01); *B60G 21/055* (2013.01); *C21D 9/02* (2013.01); *F16F 1/025* (2013.01);
(Continued)

(58) Field of Classification Search
CPC .... F16F 1/025; F16F 1/041; F16F 1/14; F16F 1/145; F16F 2224/0208; F16F 2226/04;
(Continued)

(56) References Cited

U.S. PATENT DOCUMENTS

| | | | | |
|---|---|---|---|---|
| 6,418,770 B1 * | 7/2002 | Binno | .................. | B60G 21/055 72/58 |
| 6,682,610 B1 * | 1/2004 | Inoue | ....................... | C21D 7/06 148/590 |

(Continued)

FOREIGN PATENT DOCUMENTS

| | | |
|---|---|---|
| JP | S5978720 | 5/1984 |
| JP | H0789325 | 4/1995 |
| JP | 2000234688 | 8/2000 |
| JP | 2007127227 | 5/2007 |
| JP | 2009107031 | 5/2009 |
| JP | 2009125827 | 6/2009 |
| JP | 2010188844 | 9/2010 |
| JP | 202038010 | 3/2020 |
| WO | 2018152226 | 8/2018 |

OTHER PUBLICATIONS

International Search Report for International Application No. PCT/JP2020/019498 completed Aug. 3, 2020.

*Primary Examiner* — Thomas J Williams
(74) *Attorney, Agent, or Firm* — Carlson, Gaskey & Olds, P.C.

(57) ABSTRACT

A method includes, providing a tubular member (10) used for a hollow spring, and applying the compressive residual stress to at least a portion of an inner surface of the steel tube by applying the compressive force to at least a portion of an outer surface of the tubular member (10) from a circumferential direction, and a fatigue life of the tubular member (10) is prolonged by applying the compressive residual stress to the inner surface of the tubular member (10). Applying the force to the outer surface of the tubular member (10) includes pressing the tubular member (10) with a die (1). The die (1) has a pressing surface (1*a*) shaped such that the compressive force can be applied to at least the portion of the outer surface of the tubular member (10) from the circumferential direction.

6 Claims, 9 Drawing Sheets

(52) U.S. Cl.
CPC ........ *F16F 1/145* (2013.01); *B60G 2202/135* (2013.01); *B60G 2206/012* (2013.01); *B60G 2206/427* (2013.01); *B60G 2206/724* (2013.01); *B60G 2206/81* (2013.01); *C21D 9/08* (2013.01); *F16F 2224/0208* (2013.01); *F16F 2226/04* (2013.01); *F16F 2228/08* (2013.01); *F16F 2238/024* (2013.01)

(58) Field of Classification Search
CPC ............ F16F 2228/08; F16F 2238/024; B60G 21/055; B60G 2202/135; B60G 2206/012; B60G 2206/427; B60G 2206/724; B60G 2206/81; C21D 9/02; C21D 9/08
See application file for complete search history.

(56) References Cited

U.S. PATENT DOCUMENTS

| | | | |
|---|---|---|---|
| 8,978,432 B2* | 3/2015 | Christianson | B21D 26/033 |
| | | | 72/58 |
| 2011/0121639 A1* | 5/2011 | Fukushi | B21D 22/025 |
| | | | 301/124.1 |
| 2013/0093153 A1* | 4/2013 | Ito | B05D 3/14 |
| | | | 427/545 |
| 2019/0126714 A1* | 5/2019 | Wada | B21C 37/15 |
| 2020/0094376 A1 | 3/2020 | Sayama | |
| 2022/0170524 A1* | 6/2022 | Sayama | F16F 1/14 |

* cited by examiner

FIG. 3
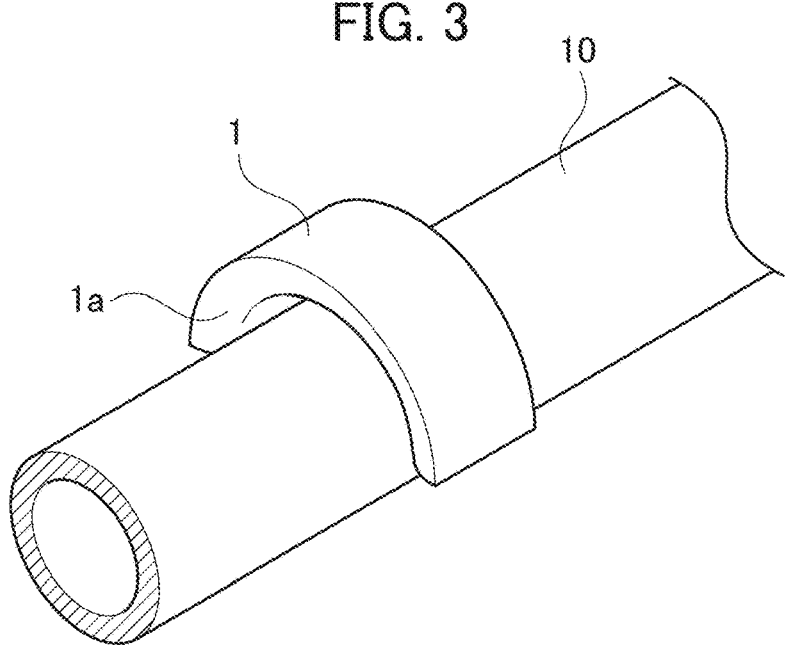
FIG. 4
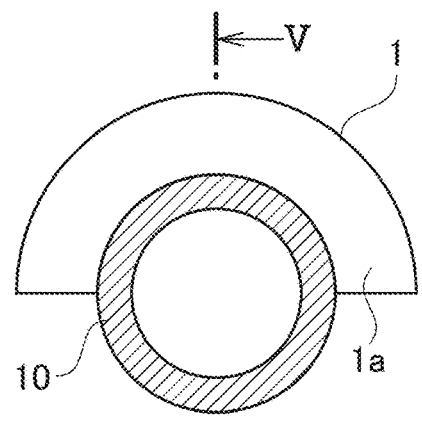
FIG. 5
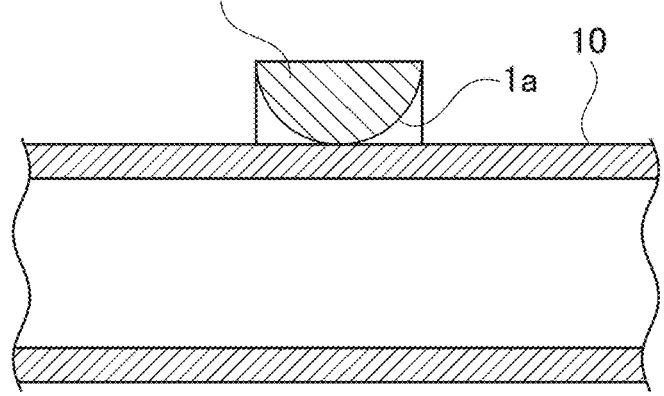

HOLLOW SPRING AND METHOD OF MANUFACTURING THE SAME

TECHNICAL FIELD

The present invention relates to a hollow spring having a prolonged fatigue life and a method of manufacturing the hollow spring.

BACKGROUND ART

The use of a hollow spring to a vehicle such as an automobile has been considered to meet the demand for the reduction in the weight of the vehicle. In order to reduce a roll of a vehicle body caused at the time of cornering, as a kind of the hollow spring, provided, for example, is a hollow stabilizer that is formed by performing the bending processing to a steel tube or the like so that the steel tube has a predetermined shape. In recent years, from the viewpoint of saving resources and energy, the demand for the weight reduction of the vehicle has tended to further increase, and the demand for stabilizers from a solid stabilizer to the hollow stabilizer has still further increased (refer to Patent Document 1).

In the hollow spring, normally, the stress on an inner surface of a tube is lower than that on an outer surface of the tube, but if the shot peening is applied to the outer surface to impart the compressive residual stress to the outer surface, the stress on the outer surface is relieved and the stress difference between the outer and the inner surfaces is reduced. If the thickness of the hollow spring is reduced in order to reduce the weight of the hollow spring, this tendency becomes more remarkable, and the breakage starting from the inner surface may occur.

Generally, the fatigue breaking occurs from a surface, and thus, by applying the compressive residual stress on an inner surface of the hollow spring, the stress on the inner surface can be relieved, and accordingly, a fatigue life of the hollow spring can be prolonged. For example, Patent Document 2 discloses a technique in which a reflection member is arranged to a hole of a pipe, the projected shot is reflected by a reflection unit, and the shot peening is applied to an inner surface to impart the compressive residual stress to the inner surface. Patent Document 3 discloses a technique in which a reflection member of the shot is supported relative to an inner surface of a hole of a pipe by a guide member and is moved along the hole of the pipe by a wire.

PRIOR ART DOCUMENTS

Patent Documents

Patent Document 1: JP H07-89325 A
Patent Document 2 JP 2009-107031 A
Patent Document 3 JP 2009-125827 A

SUMMARY OF THE INVENTION

Problem to be Solved by the Invention

However, the techniques disclosed in Patent Literatures 2 and 3 require certain components in equipment such as a dust collector for collecting the reflection member disposed to the hole of the pipe, the guide member, the wire, and the shot. Further, there has been a concern that an inner surface of a bending portion of a pipe may be scratched because, at the bending portion, when the reflection member is moved by the wire, the guide member slides along the inner surface. Still further, sometimes, the techniques have been not able to cope with a pipe with a more complicated shape or a smaller diameter because the reflection member or the like is arranged to the hole of the pipe and is moved.

A present embodiment is proposed in view of the above described circumstances, and an object of the present invention to provide a hollow spring with a prolonged fatigue life by applying the compressive residual stress to an inner surface thereof, and a method of manufacturing the hollow spring.

Means for Solving the Problem

In order to solve the above described problems, a hollow spring according to the present application is configured from a steel tube, and the compressive residual stress directed in an axial direction of the steel tube is applied to at least a portion of an inner surface of the steel tube so as to reduce the tensile stress directed in the axial direction of the steel tube caused when a load is applied to the steel tube.

At least the portion may include an inner surface of a specific portion of the steel tube at which the tensile stress is concentrated when a load is applied to the hollow spring. The hollow spring is a stabilizer, and at least the portion may include a bending portion of the steel tube constituting the stabilizer.

A method of manufacturing the hollow spring according to the present application includes, providing a steel tube used for the hollow spring, and applying the compressive force to at least a portion of an outer surface of the steel tube from a circumferential direction to apply the compressive residual stress to at least a portion of an inner surface of the steel tube, and in the method, a fatigue life of the steel tube is prolonged by applying the compressive residual stress to the inner surface of the steel tube.

Applying the compressive force to the outer surface of the steel tube may include pressing the steel tube with a die. The die may include a pressing surface shaped such that the compressive force can be applied to the at least the portion of the outer surface of the steel tube from the circumferential direction. The pressing surface may extend in the circumferential direction along the outer surface of the steel tube. The pressing surface may reach a half of a circumference in the circumferential direction of the steel tube. The pressing surface may have a round shape and face the outer surface of the steel tube in an axial direction of the steel tube. The steel tube pressed with the die may be supported by a flat surface.

The steel tube may be subjected to the bending processing to have a predetermined shape. The steel tube may be subjected to a heat treatment.

The hollow spring according to the present application is manufactured by the above described method of manufacturing the hollow spring.

Advantageous Effect of the Invention

According to the present invention, a fatigue life of a hollow spring can be prolonged by applying the compressive residual stress to an inner surface of a steel tube.

BRIEF DESCRIPTION OF THE DRAWINGS

FIG. 3 is a perspective view showing a method of manufacturing a hollow spring applied to a straight portion of a tubular member.

FIG. 4 is a side view showing a method of manufacturing a hollow spring applied to a straight portion of a tubular member.

FIG. 5 is a cross sectional view showing a method of manufacturing a hollow spring applied to a straight portion of a tubular member.

EMBODIMENTS OF THE INVENTION

Hereinafter, an embodiment of a hollow spring and a method of manufacturing the hollow spring will be described in detail with reference to the drawings. The hollow spring of the present embodiment is composed of a steel tube, and the fatigue strength of the hollow spring is enhanced by applying compressive force to an outer surface of the steel tube from a circumferential direction to impart compressive residual stress to an inner surface of the steel tube.

In the present embodiment, descriptions will be given by assuming that a hollow stabilizer is the hollow spring. The hollow spring of the present embodiment corresponds to a main body of the hollow stabilizer obtained by excluding portions for connecting with other members formed at end portions from the entire hollow stabilizer. The hollow spring of the present embodiment is not limited to the hollow stabilizer, and can be applied to other types of hollow springs such as, for example, hollow coil springs for automobile suspensions.

Figure 1:
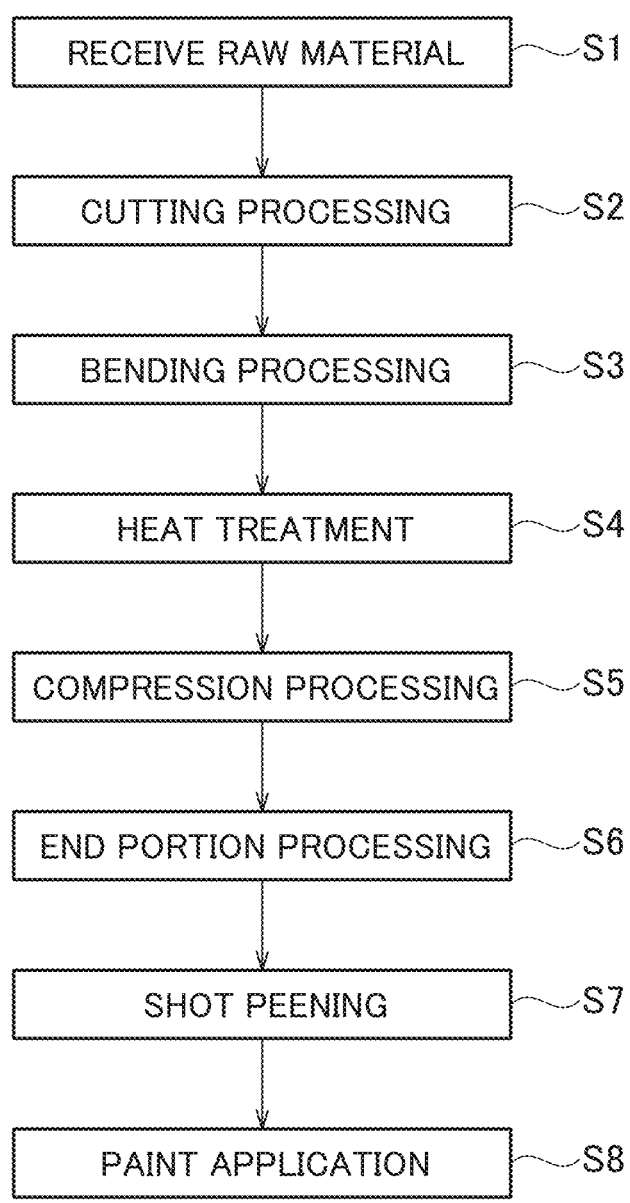
FIG. 1 is a flowchart illustrating a series of processes of manufacturing a hollow spring.

As shown in the flowchart of FIG. 1, the hollow stabilizer is manufactured through a series of processes of receiving (step S1) and cutting (step S2) the steel tube of a raw material, and of applying, to the steel tube of the raw material, bending processing (step S3), a heat treatment (step S4), compression processing (step S5), end portion processing (step S6), shot peening (step S7), and painting (step S8).

The method of manufacturing the hollow spring of the present embodiment corresponds to the process of the compression processing of step S5. In the method of manufacturing the hollow spring of the present embodiment, the steel tube subjected to the processes of the reception (step S1), cutting (step S2), the bending processing (step S3), and the heat treatment (step S4) is provided, and the compression processing is applied to the steel tube (step S5). The compression processing (step S5) may be performed after the process of the end portion processing (step S6) instead of being performed immediately after the process of the heat treatment (step S4).

Although an order will be different from the order shown in FIG. 1, in the manufacturing process of the hollow stabilizer, the end portion processing (step S6) may be performed before the heat treatment (step S4). Even in the above case, the compression processing (step S5) is performed following the heat treatment (step S4).

In the following description, a steel tube which is subjected to the processes of steps S1 to S4 of FIG. 1 and thereafter is applied with the method of manufacturing the hollow spring of the present embodiment corresponding to the process of step S5 is referred to as a tubular member for convenience.

Figure 2:
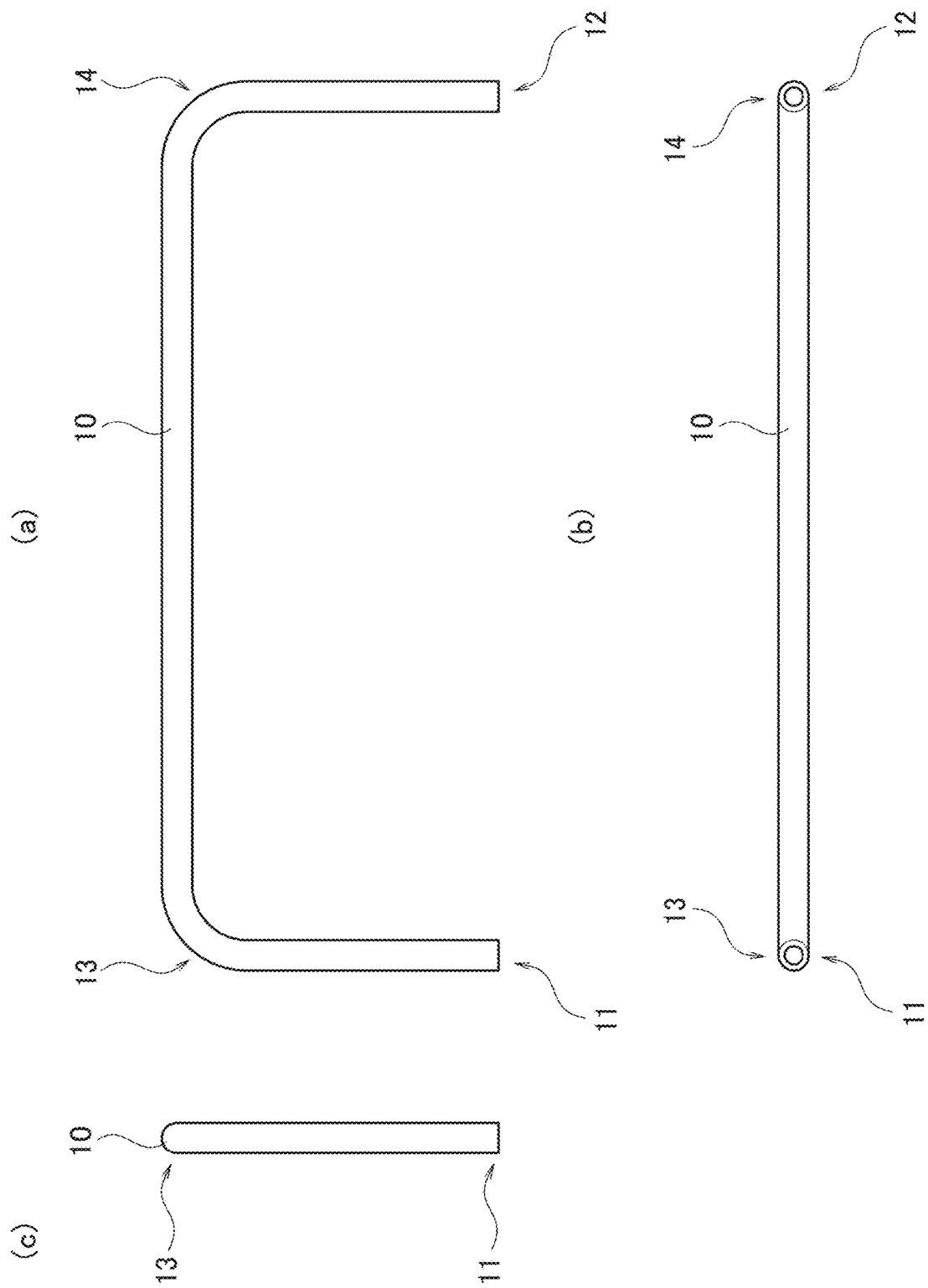
FIG. 2 is a three-view drawing showing a tubular member.

FIG. 2 is a three-view drawing showing the tubular member 10. FIG. 2(a) is a top view, FIG. 2(b) is a front view, and FIG. 2(c) is a side view. The tubular member 10 is formed to have substantially a shape of C that is inverted to face leftward by performing the bending processing, and has a first bending portion 13 in the vicinity of a first end 11 and a second bending portion 14 in the vicinity of a second end 12, and further includes a straight portion in addition to the first bending portion 13 and the second bending portion 14.

As the method of manufacturing the hollow spring of the present embodiment, a method of performing the compression processing to the tubular member 10 by pressing a die will be described. In the present embodiment, descriptions will be given for each of the straight portion and the bending portion of the tubular member 10 separately.

First, a case will be described in which the present embodiment is applied to the straight portion of the tubular member 10. FIGS. 3 to 5 are diagrams showing the method of manufacturing the hollow spring of the present embodiment applied to the straight portion of the tubular member 10. FIG. 3 is a perspective view, FIG. 4 is a side view, and FIG. 5 is a cross sectional view taken along a cross section V-V of FIG. 4.

The straight portion of the tubular member 10 is supported by a flat top surface of a table that extends substantially horizontally (not shown). At a predetermined position of the tubular member 10 in an axial direction, the die 1 is arranged so as to cover a predetermined width in the axial direction of an upper half portion of the tubular member 10.

The die 1 has a pressing surface 1a shaped such that the compressive force can be applied to at least a part of the outer surface of the tubular member 10 from the circumferential direction. More specifically, the pressing surface 1a extends in the circumferential direction along the outer surface of the tubular member 10 and reaches a half of a circumference in the circumferential direction so as to cover the upper half portion of the tubular member 10. Further, the die 1 has a pressing surface 1a with a round shape which faces and comes into contact with the outer surface of the tubular member 10 in the axial direction. The die 1 may be made of tool steel.

Pressing such the die 1 causes the compressive force to be applied to the tubular member 10 from the circumferential direction so that the compression processing is performed on the tubular member 10. As shown in FIG. 5, the pressing surface 1a with the round shape of the die 1 contacts with a predetermined range of the outer surface of the tubular member 10 in a cross section extending in a radial direction of the tubular member 10. The range of the outer surface of the tubular member 10 contacting the pressing surface 1a extends to the upper half portion of the tubular member 10 in the circumferential direction, and an entire range in which the pressing surface 1a contacts the outer surface of the tubular member 10 forms an upper semicircle extending along the outer surface of the tubular member 10 in a plane orthogonal to an axis of the tubular member 10.

If the die 1 is pressed in such the state, the compressive force is applied to the tubular member 10 from the circumferential direction, and the deformation in the axial direction of the tubular member 10 is caused in the vicinity of an range of the inner surface of the tubular member 10 corresponding to the range where the pressing surface 1a of the die 1 contacts the outer surface, but the displacement is constrained by surrounding materials. Therefore, when the pressing load of the die 1 is removed, the compressive residual stress is applied to the inner surface of the tubular member 10 in the axial direction.

Figure 6:
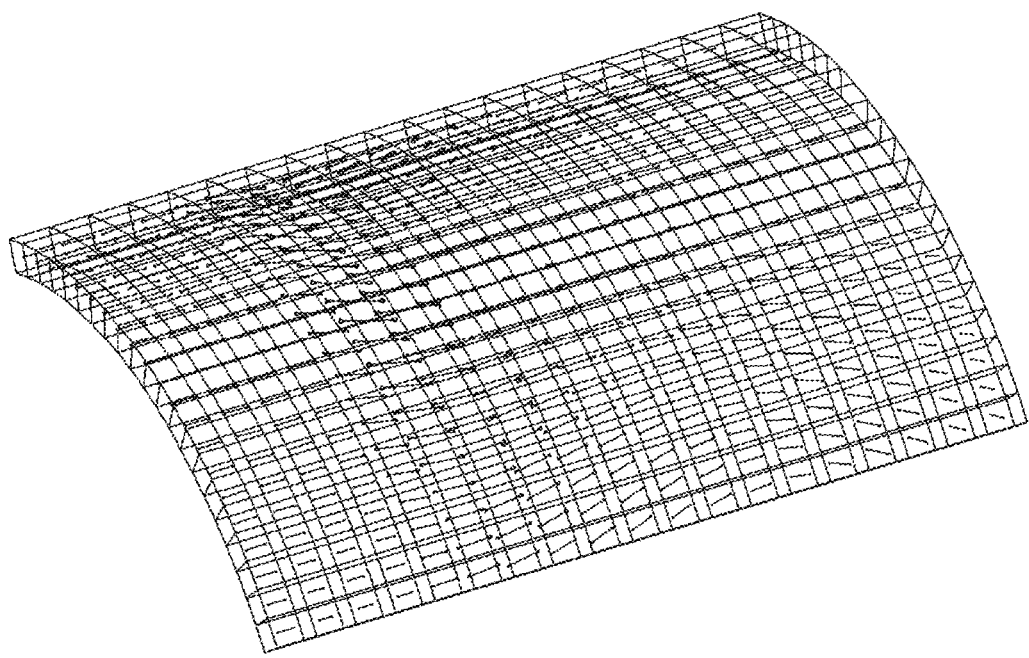
FIG. 6 is a perspective view showing the distribution of the minimum principal stress on an inner surface of a straight portion of a tubular member subjected to the compression processing.

FIG. 6 is a perspective view showing the distribution of the minimum principal stress on the inner surface of the straight portion of the tubular member 10 applied with the compression processing. The distribution of the minimum principal stress is calculated based on a finite element method. The minimum principal stress in this case corresponds to the compressive stress which is a negative value. It was confirmed that the minimum principal stress was remained after the removal of the pressing load of the die 1, and thus, it became clear that the compressive residual stress was applied to the inner surface. As can be seem from arrows in FIG. 6, it can be observed that the minimum principal stress generally points in the axial direction of the tubular member 10.

Effects on the straight portion of the tubular member 10 by performing the compression processing was confirmed by performing experiments. A steel tube subjected to the heat treatment was used as a target object of the compression processing. The steel tube had an outer diameter of 28.6 mm, the thickness of 4 mm, and the length of 300 mm. In the experiment, a strain gauge was attached to the inner surface of the steel tube, and the residual stress was calculated from the strain detected on the inner surface of the steel tube before and after performing the compression processing.

Table 1 shows experimental results of the relationship among the load applied to the die 1, the strain and the residual stress. In Table 1, values in a column "during compression" are values obtained by applying the load to the press, and alternatively, values in a column "time of release" are values obtained by removing the load from the press.

TABLE 1

| | STRAIN (με) | | STRESS (MPa) | |
|---|---|---|---|---|
| APPLIED LOAD (N) | DURING COMPRESSION | TIME OF RELEASE | DURING COMPRESSION | TIME OF RELEASE |
| 101640 | −925 | −32 | −190.55 | −6.592 |
| 127050 | −1367 | −257 | −281.6 | −52.942 |
| 152460 | −2314 | −1222 | −476.68 | −251.73 |
| 177870 | −3261 | −2187 | −671.77 | −450.52 |
| 203280 | −4208 | −3152 | −866.85 | −649.31 |

As shown in Table 1, the stress of the inner surface of the steel tube took negative values in a column of "Time of release" at which the load was removed from the press and it was observed that the compressive residual stress was imparted on the inner surface of the steel tube by performing the compression processing. Further, it was observed that, as the applied load increases, the stress of the negative value of the inner surface of the steel tube at the time of release further decreases, and as the compressive force applied during the compression processing increases, the compressive residual stress further increases.

Furthermore, the effect of the compressive residual stress applied to the straight portion of the tubular member 10 was confirmed by performing a 4-point bending fatigue test. As a target object for performing the fatigue test, used is the steel tube which was used as the target object in the experiment of the compression processing, and is subjected to the compression processing by using the press of 152460 N among the loads shown in Table 1 under the same condition as in the experiment of the compression processing.

Figure 7:
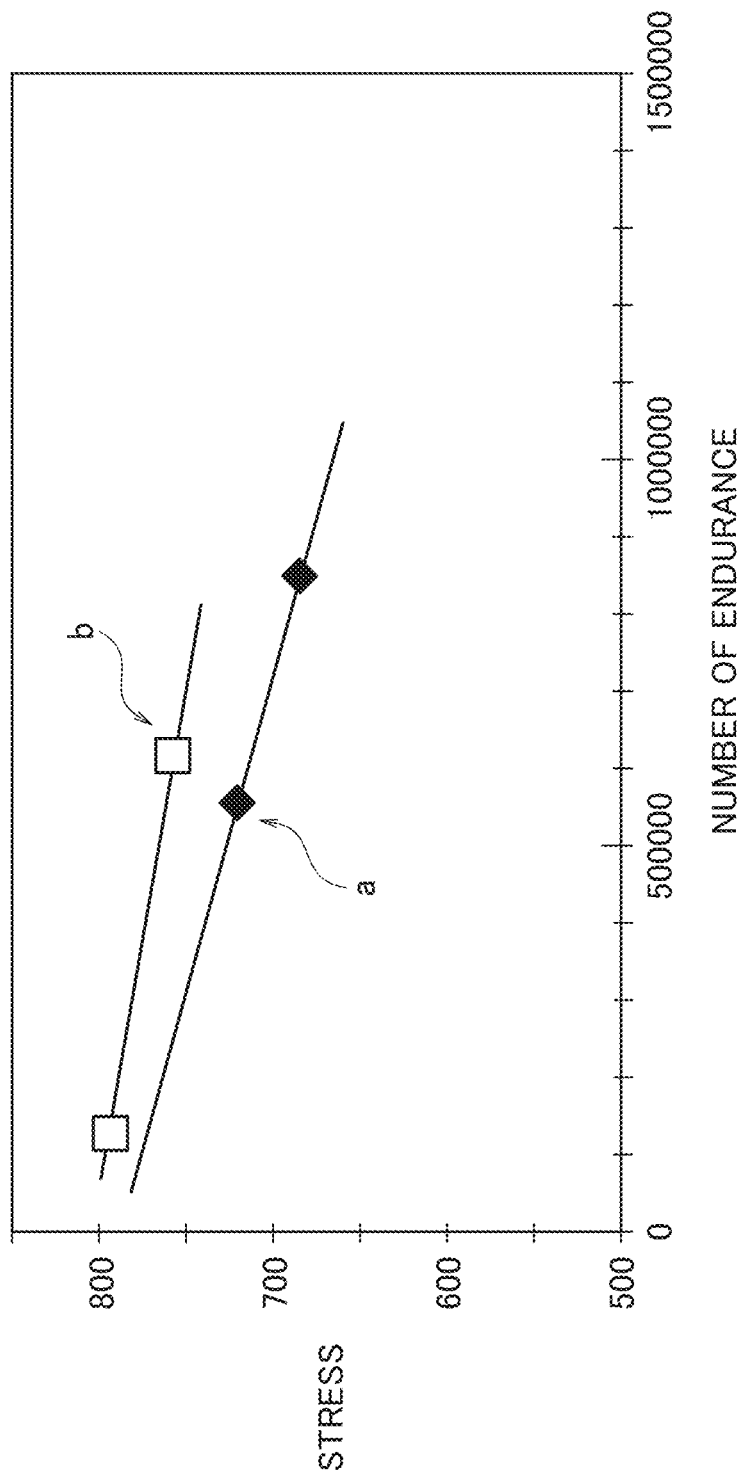
FIG. 7 is a graph showing results obtained by performing a fatigue test.

Table 2 shows the results obtained by performing the fatigue test for each of two target objects that are one target object subjected to the compression processing and the other target object not subjected to the compression processing. FIG. 7 shows the results obtained by performing the fatigue test shown in Table 2 in a graph, and the graph has a horizontal axis representing the number of endurance and a vertical axis representing the applied stress. In FIG. 7, data point A represents the steel tube not subjected to the compression processing, and alternatively, data point B represents the steel tube subjected to the compression processing.

TABLE 2

| | APPLIED STRESS (MPa) | NUMBER OF ENDURANCE |
|---|---|---|
| COMPRESSION PROCESSING NOT PERFORMED | 720 | 551000 |
| | 684 | 848000 |
| COMPRESSION PROCESSING PERFORMED | 792 | 126000 |
| | 756 | 616000 |

The graph in FIG. 7 shows, in a range in the vicinity of the number of endurance where the fatigue test was performed, two data points A representing the steel tube not subjected to the compression processing and alternatively two data points B representing the steel tube subjected to the compression processing, and each of the two data points A and the data points B are connected each other and extended to form a linear relationship between the number of endurance and the applied stress of the graph. With reference to the above, in both cases of the steel tube subjected to the compression processing and the steel tube not subjected to the compression processing, it was observed that, as the applied pressure increases, the number of endurance decreased more. On the other hand, it was observed that the number of endurance corresponding to the same applied stress was significantly increased in the case of the steel tube subjected to the compression processing than in the case of the steel tube not subjected to the compression processing. This clarified that the fatigue life of the tubular member is prolonged by applying the compression processing to the tubular member to impart the compressive residual stress to the inner surface.

Figure 8:
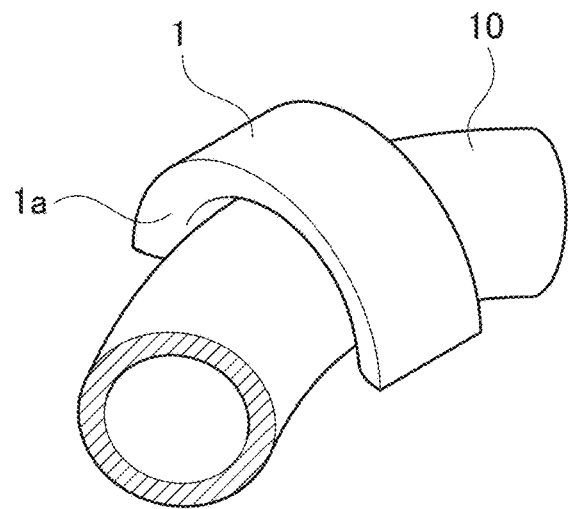
FIG. 8 is a perspective view showing a method of manufacturing a hollow spring applied to a bending portion of a tubular member.
Figure 9:
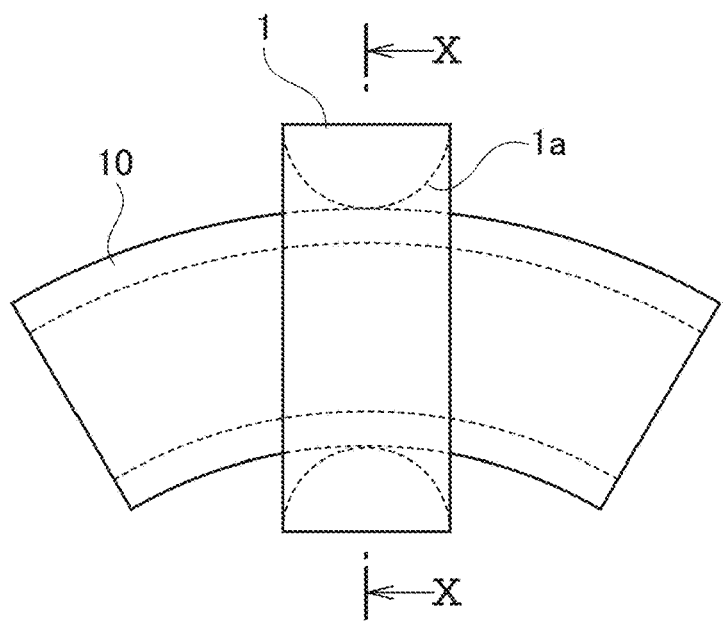
FIG. 9 is a top view illustrating a method of manufacturing a hollow spring applied to a bending portion of a tubular member.
Figure 10:
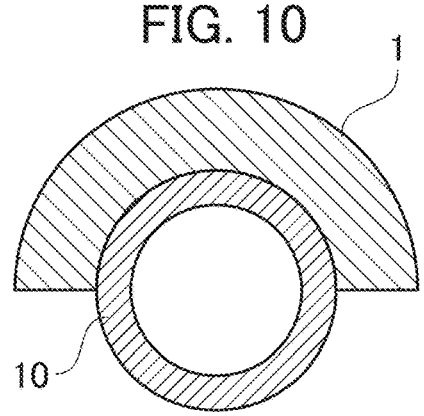
FIG. 10 is a cross sectional view showing a method of manufacturing a hollow spring applied to a bending portion of a tubular member.

Next, a case will be described in which the present embodiment is applied to the bending portions of the tubular member 10. FIGS. 8 to 10 are diagrams showing the method of manufacturing the hollow spring of the present embodiment applied to the bending portions of the tubular member 10. FIG. 8 is a perspective view, FIG. 9 is a top view, and FIG. 10 is a cross sectional view taken along a cross section X-X of FIG. 9.

The bending portion of the tubular member 10 is supported by a flat top surface of a table extending substantially horizontally (not shown). At a predetermined position of the tubular member 10 in the axial direction, a die 1 is arranged so as to cover a predetermined range of the upper half portion of the tubular member 10 in the axial direction. The die 1 applied to the bending portion of the tubular member 10 may have a shape different from that of the die 1 applied to the straight portion of the tubular member 10 described above, but in order to clarify the correspondence relationship between them, descriptions are given by denoting them with a common reference numeral.

The die 1 has the pressing surface 1a shaped such that the compressive force can be applied to at least a part of the outer surface of the tubular member 10 from the circumferential direction. More specifically, the pressing surface 1a extends in the circumferential direction along the outer surface of the tubular member 10 and reaches a half of a circumference in the circumferential direction so as to cover the upper half portion of the tubular member 10. Further, the die 1 has the pressing surface 1a of a round shape which faces and contacts the outer surface of the tubular member 10 in the axial direction of the tubular member 10. The pressing surface 1a of the die 1 may be formed of tool steel.

Pressing such the die 1 causes the compressive force to be applied to the tubular member 10 from the circumferential direction so that the compression processing is performed to the tubular member 10. In the case of the bending portion of the tubular member 10 also, similarly to the case of the straight portion shown in FIG. 5, the pressing surface 1a with the round shape of the die 1 contacts a predetermined range of the outer surface of the tubular member 10 in a cross section extending in a radial direction of the tubular member 10. As shown in FIG. 10, the range of the outer surface of the tubular member 10 contacting the pressing surface 1a extends to the upper half portion of the tubular member 10 in the circumferential direction, and an entire range in which the pressing surface 1a contacts the outer surface of the tubular member 10 forms an upper semicircle extending along the outer surface of the tubular member 10 in a plane orthogonal to an axis of the tubular member 10.

If the die 1 is pressed in such the state, the compressive force is applied to the tubular member 10 from the circumferential direction, and the deformation in the axial direction of the tubular member 10 is caused in the vicinity of an range of the inner surface of the tubular member 10 corresponding to the range where the pressing surface 1a of the die 1 contacts the outer surface, but the displacement is constrained by surrounding materials. Therefore, when the pressing load of the die 1 is removed, compressive residual stress is imparted to the inner surface of the tubular member 10 in the axial direction.

Figure 11:
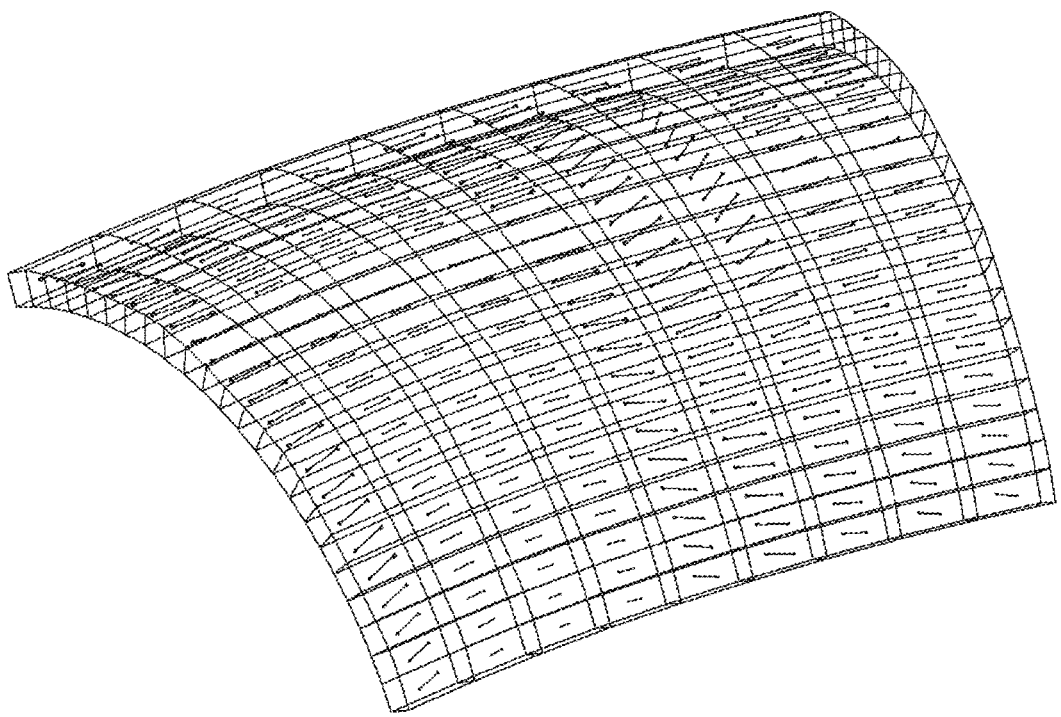
FIG. 11 is a perspective view showing the distribution of the minimum principal stress on an inner surface of a bending portion of a tubular member subjected to the compression processing.

FIG. 11 is a perspective view showing the distribution of the minimum principal stress on the inner surface of the bending portion of the tubular member 10 subjected to the compression processing. The distribution of the minimum principal stress is calculated based on a finite element method. The minimum principal stress in this case corresponds to the compressive stress which is a negative value. It was confirmed that the minimum principal stress was remained after the removal of the pressing load of the die 1, and thus, it became clear that the compressive residual stress was imparted to the inner surface. As can be seen from arrows in FIG. 11, it can be observed that the minimum principal stress generally point in the axial direction of the tubular member 10.

Figure 12:
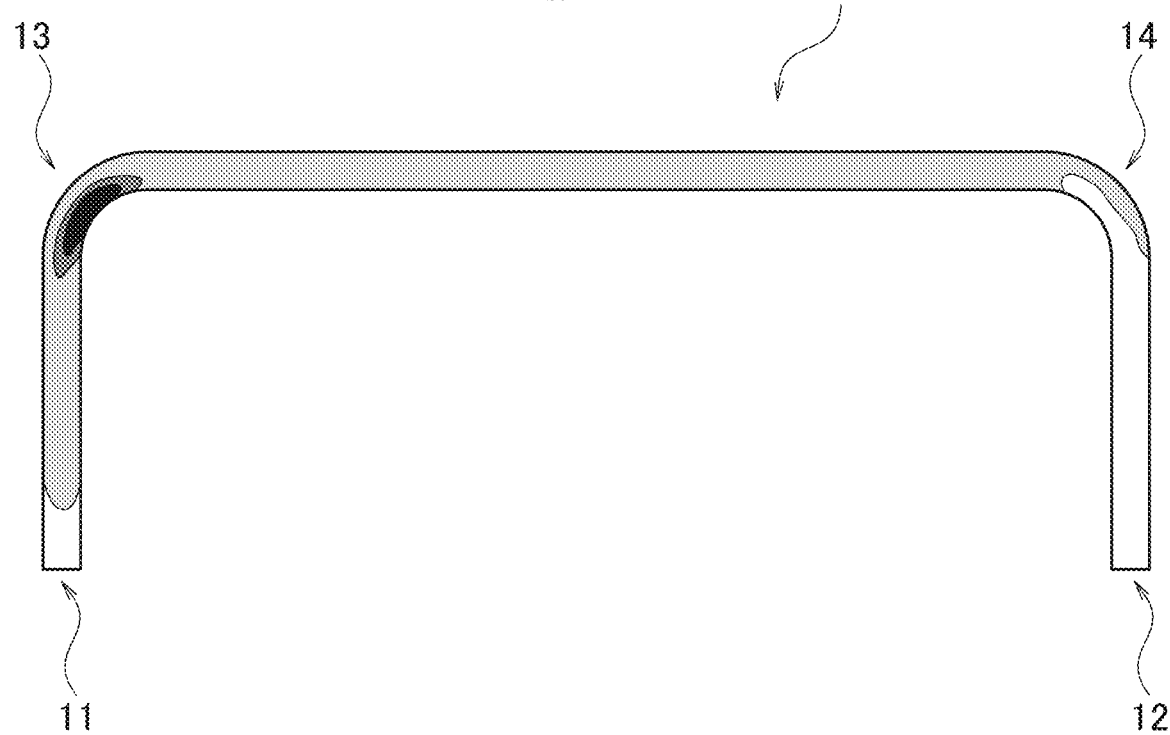
FIG. 12 is a top view showing the distribution of the magnitude of the maximum principal stress generated when a load is applied to a tubular member.

FIG. 12 is a top view showing the distribution of the magnitude of the maximum principal stress generated when the load is applied to the tubular member 10. In FIG. 12, the distribution of the magnitude of the maximum principal stress generated when the load is applied between the first end 11 and the second end 12 of the tubular member 10 is obtained based on the finite element method. The maximum principal stress in this case corresponds to the tensile stress which is a positive value. FIG. 12 shows that as a color of an area is dark, the maximum principal stress is larger, and thus, in a black area, the maximum principal stress is the largest, and alternatively, in a white area, the maximum principal stress is the smallest. From FIG. 12, it can be observed that the maximum principal stress is the largest at a first bending portion 13 in the vicinity of the first end 11.

Figure 13:
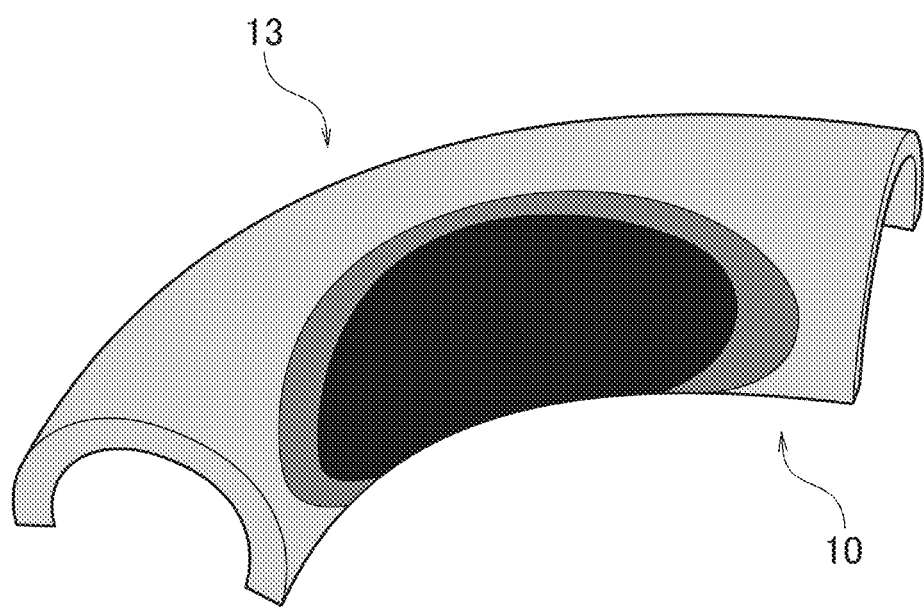
FIG. 13 is a partially enlarged perspective view showing the distribution of the magnitude of the maximum principal stress at a bending portion of the tubular member of FIG. 12.

FIG. 13 is a partially enlarged perspective view showing the distribution of the magnitude of the maximum principal stress at the first bending portion 13 of the tubular member 10 of FIG. 12. From FIG. 13, it can be observed that an area of the first bending portion 13, in which the maximum principal stress is large, generally extends along the axial direction of the tubular member 10.

Figure 14:
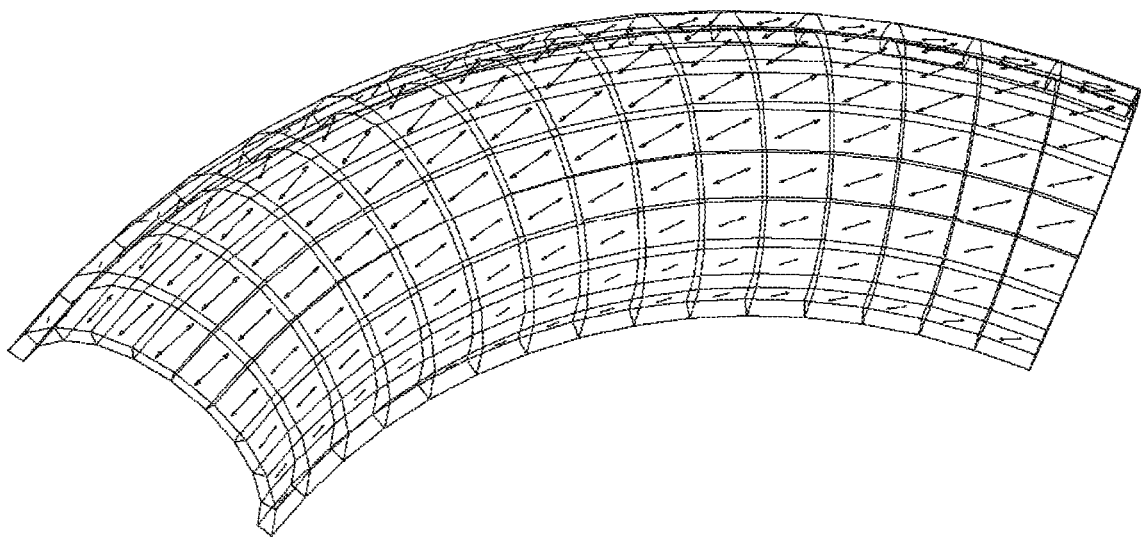
FIG. 14 is a perspective view showing the distribution of the maximum principal stress on an inner surface of the bending portion of FIG. 13.

FIG. 14 is a diagram showing the distribution of the maximum principal stress at the first bending portion 13 of FIG. 13. The distribution of the maximum principal stress is calculated based on the finite element method. The maximum principal stress in this case also corresponds to the tensile stress which is a positive value. As shown by arrows in FIG. 14, it is observed that a direction of the maximum principal stress generally points in the axial direction of tubular member 10.

With reference to the distribution of the minimum principal stress on the inner surface of the bending portion of the tubular member 10 subjected to the compression processing shown in FIG. 11, the minimum principal stress at the bending portion corresponding to the compressive residual stress imparted by performing the compression processing is approximately directed in the axial direction of the tubular member 10. The maximum principal stress corresponding to the tensile stress of the tubular member 10 generated when the load is applied to the tubular member as shown in FIGS. 13 and 14 is approximately directed in the same axial direction as the direction of the minimum principal stress. Accordingly, the compressive residual stress of the negative value corresponding to the minimum principal stress can reduce the tensile stress which is the positive value corresponding to the maximum principal stress.

Therefore, by performing the compression processing and imparting the compressive residual stress, to a portion of the tubular member 10 at which the large tensile stress is caused when being applied with a load, such as the first bending portion 13, the caused tensile stress is reduced, and accordingly the tensile stress can be relieved. This reduces the load imposed on the inner surface of the tubular member 10 due to the tensile stress, and accordingly, the fatigue life of the tubular member 10 can be prolonged.

As described above, according to the present embodiment, the compressive residual stress is applied to the inner surface of the tubular member 10 configuring the hollow spring, and accordingly, the fatigue life of the tubular member 10 can be prolonged. Specifically, pressing the die 1 enables the compressive residual stress to be imparted to the inner surface of a desired portion regardless of whether the portion is the straight portion or the bending portion of the tubular member 10. The compressive residual stress can be sufficiently imparted by pressing the die 1, and thus, a complicated equipment configuration or the like is not required.

Further, the compressive residual stress can be applied to the inner surface of a specific portion such as the bending portion at which the tensile stress concentrates and becomes the high stress when a load is applied to a hollow stabilizer. This enables the reduction in the tensile stress at the high stress portion by the compressive residual stress to prolong the fatigue life. Further, the compressive residual stress can be imparted to the bending portion of the tubular member 10 such that the direction of the minimum principal stress corresponding to the compressive residual stress matches the direction of the maximum principal stress corresponding to the tensile stress.

INDUSTRIAL APPLICABILITY

The present invention can be applied to a hollow spring used for a vehicle such as an automobile and a method of manufacturing the hollow spring.

DESCRIPTION OF REFERENCE NUMERALS

1 die
1a Pressing surface
10 Tubular member
11 First end
12 Second end
13 First bending portion
14 Second bending portion

The invention claimed is:

1. A method of manufacturing a hollow spring, comprising:
providing a steel tube processed by bending to a predetermined shape used for the hollow spring; and
applying compressive force to at least a portion of an outer surface of the steel tube, including a portion processed by bending, from a circumferential direction to apply compressive residual stress to at least a portion of an inner surface of the steel tube; wherein
applying the compressive force to the outer surface of the steel tube comprises pressing the steel tube with a die,
the die comprises a pressing surface shaped such that the compressive force can be applied to the at least the portion of the outer surface of the steel tube, including the portion processed by bending, from the circumferential direction,
the pressing surface extends in the circumferential direction along the outer surface of the steel tube,
the pressing surface extends in the circumferential direction of the steel tube over a half of a circumference, and
a fatigue life of the steel tube is prolonged by applying the compressive residual stress to the inner surface of the steel tube.

2. The method according to claim 1, wherein the pressing surface includes a round shape and faces the outer surface of the steel tube in an axial direction of the steel tube.

3. The method according to claim 2, wherein
the steel tube pressed with the die is supported by a flat surface.

4. The method according to claim 1, wherein the steel tube pressed with the die is supported by a flat surface.

5. The method according to claim 1, wherein the steel tube is subjected to a heat treatment.

6. The hollow spring manufactured by the method according to claim 1.

* * * * *